US009460088B1

United States Patent
Sak et al.

(10) Patent No.: US 9,460,088 B1
(45) Date of Patent: Oct. 4, 2016

(54) WRITTEN-DOMAIN LANGUAGE MODELING WITH DECOMPOSITION

(71) Applicant: Google Inc., Mountain View, CA (US)

(72) Inventors: Hasim Sak, New York, NY (US); Yun-hsuan Sung, Mountain View, CA (US); Cyril Georges Luc Allauzen, Queens, NY (US)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 13/906,654

(22) Filed: May 31, 2013

(51) Int. Cl.
| G06F 17/28 | (2006.01) |
| G06F 17/27 | (2006.01) |
| G10L 15/26 | (2006.01) |
| G10L 15/28 | (2013.01) |
| G10L 15/06 | (2013.01) |
| G10L 15/14 | (2006.01) |
| G10L 15/04 | (2013.01) |
| G10L 19/00 | (2013.01) |
| G10L 21/00 | (2013.01) |
| G10L 25/00 | (2013.01) |

(52) U.S. Cl.
CPC .................................. *G06F 17/2881* (2013.01)

(58) Field of Classification Search
CPC ............ G06F 17/289; G06F 17/2785; G11C 2207/16; G10L 15/08; G10L 15/265; G10L 15/22; G10L 15/063; G10L 15/142
USPC ....... 704/2, 255, 235, 9, 231, 244, 257, 201, 704/242, 270, 256.8, 251
See application file for complete search history.

(56) References Cited

U.S. PATENT DOCUMENTS

| 5,129,001 | A | * | 7/1992 | Bahl et al. ..................... 704/251 |
| 5,815,639 | A | * | 9/1998 | Bennett et al. ............... 704/235 |
| 5,890,103 | A | * | 3/1999 | Carus ................................ 704/9 |
| 5,991,721 | A | * | 11/1999 | Asano et al. .................. 704/257 |
| 5,995,921 | A | * | 11/1999 | Richards et al. ................ 704/9 |
| 6,067,514 | A | * | 5/2000 | Chen ............................. 704/235 |

(Continued)

OTHER PUBLICATIONS

C. Chelba, J. Schalkwyk, T. Brants, V. Ha, B. Harb, W. Neveitt, C. Parada, and P. Xu, "Query language modeling for voice search," in Spoken Language Technology Workshop (SLT), 2010 IEEE, Dec. 2010, pp. 127-132.

(Continued)

*Primary Examiner* — Pierre-Louis Desir
*Assistant Examiner* — Anne Thomas-Homescu
(74) *Attorney, Agent, or Firm* — Fish & Richardson P.C.

(57) ABSTRACT

An automatic speech recognition system and method are provided for written-domain language modeling. According to one implementation, a process includes accessing decomposed training data that results from applying rewrite grammar rules to original training data, the decomposed training data comprising (i) regular words from the original training data that have not been rewritten using the set of rewrite grammar rules, and (ii) decomposed segments that result from rewriting non-lexical entities from the original training data using the rewrite grammar rules, generating a restriction model that (i) maps language model paths for regular words to themselves, and (ii) restricts language model paths for decomposed segments for non-lexical entities, training a n-gram language model over the training data, composing the restriction model and the language model to obtain a restricted language model, and constructing a decoding network by composing a context dependency model and a pronunciation lexicon with the restricted language model.

22 Claims, 7 Drawing Sheets

(56) References Cited

U.S. PATENT DOCUMENTS

| | | | |
|---|---|---|---|
| 6,073,098 A * | 6/2000 | Buchsbaum et al. | 704/255 |
| 6,178,401 B1 * | 1/2001 | Franz et al. | 704/255 |
| 6,233,546 B1 * | 5/2001 | Datig | G06F 17/271 704/7 |
| 6,243,679 B1 * | 6/2001 | Mohri et al. | 704/256.8 |
| 6,311,152 B1 * | 10/2001 | Bai | G06F 17/277 704/251 |
| 6,385,579 B1 * | 5/2002 | Padmanabhan | G10L 15/063 704/243 |
| 6,393,399 B1 * | 5/2002 | Even | G10L 15/193 704/235 |
| 6,965,861 B1 * | 11/2005 | Dailey et al. | 704/242 |
| 7,277,850 B1 * | 10/2007 | Hakkani-Tur | G10L 15/083 704/232 |
| 7,493,293 B2 * | 2/2009 | Kanungo | G06F 17/278 706/12 |
| 7,711,545 B2 * | 5/2010 | Koehn | G06F 17/2818 704/10 |
| 8,355,905 B2 * | 1/2013 | Fokoue-Nkoutche | G06F 17/30734 704/1 |
| 8,650,031 B1 * | 2/2014 | Mamou | G10L 15/08 704/2 |
| 8,914,286 B1 * | 12/2014 | Secker-Walker et al. | 704/244 |
| 9,064,006 B2 * | 6/2015 | Hakkani-Tur | G06F 17/30663 |
| 9,190,055 B1 * | 11/2015 | Kiss | G10L 15/07 |
| 9,292,489 B1 * | 3/2016 | Sak | G06F 17/2785 |
| 2002/0069055 A1 * | 6/2002 | Tang et al. | 704/235 |
| 2002/0111806 A1 * | 8/2002 | Franz et al. | 704/255 |
| 2002/0128821 A1 * | 9/2002 | Ehsani | G10L 15/193 704/10 |
| 2002/0143525 A1 * | 10/2002 | Lewis | 704/201 |
| 2003/0191625 A1 * | 10/2003 | Gorin | G06F 17/278 704/1 |
| 2004/0111264 A1 * | 6/2004 | Wang | G06F 17/278 704/257 |
| 2004/0220809 A1 * | 11/2004 | Wang et al. | 704/257 |
| 2005/0149851 A1 * | 7/2005 | Mittal | G06F 17/2235 715/205 |
| 2005/0240413 A1 * | 10/2005 | Asano et al. | 704/270 |
| 2005/0273336 A1 * | 12/2005 | Chang et al. | 704/257 |
| 2007/0043562 A1 * | 2/2007 | Holsinger et al. | 704/231 |
| 2007/0100814 A1 * | 5/2007 | Lee | G06F 17/278 |
| 2008/0091427 A1 * | 4/2008 | Olsen | 704/254 |
| 2008/0147381 A1 * | 6/2008 | Yu et al. | 704/9 |
| 2009/0099841 A1 * | 4/2009 | Chen | 704/9 |
| 2009/0281789 A1 * | 11/2009 | Waibel | G06F 17/2735 704/3 |
| 2010/0076761 A1 * | 3/2010 | Juergen et al. | 704/235 |
| 2010/0318355 A1 * | 12/2010 | Li et al. | 704/244 |
| 2011/0178791 A1 * | 7/2011 | Stymne | G06F 17/2755 704/2 |
| 2011/0202330 A1 * | 8/2011 | Dai et al. | 704/2 |
| 2012/0072204 A1 * | 3/2012 | Nasri | G06F 17/2229 704/9 |
| 2013/0030787 A1 * | 1/2013 | Cancedda et al. | 704/2 |
| 2013/0325436 A1 * | 12/2013 | Wang et al. | 704/9 |
| 2013/0325442 A1 * | 12/2013 | Dahlmeier et al. | 704/9 |
| 2014/0149119 A1 * | 5/2014 | Sak | G06F 17/2775 704/260 |
| 2014/0163951 A1 * | 6/2014 | Nikoulina | G06F 17/2809 704/4 |
| 2014/0214406 A1 * | 7/2014 | Liu et al. | 704/9 |
| 2014/0244261 A1 * | 8/2014 | Arisoy et al. | 704/257 |
| 2014/0324434 A1 * | 10/2014 | Vozila | G10L 15/18 704/257 |
| 2014/0372119 A1 * | 12/2014 | Parada | G06F 17/30899 704/246 |

OTHER PUBLICATIONS

M. Shugrina, "Formatting time-aligned ASR transcripts for readability," in Human Language Technologies: The 2010 Annual Conference of the North American Chapter of the Association for Computational Linguistics, ser. HLT '10. Association for Computational Linguistics, 2010, pp. 198-206.

H. Sak, F. Beaufays, K. Nakajima, and C. Allauzen, "Language model verbalization for automatic speech recognition," in Acoustics, Speech and Signal Processing, 2013. ICASSP 2013.IEEE International Conference on, 2013. [Online]. Available: http://goo.gl/xmCOR, 5 pages.

M. Mohri and R. Sproat, "An efficient compiler for weighted rewrite rules," in 34th Annual Meeting of The Association for Computational Linguistics, 1996, pp. 231-238.

B. Roark, R. Sproat, C. Allauzen, M. Riley, J. Sorensen, and T. Tai, "The opengrm open-source finite-state grammar software libraries," in Proceedings of the ACL 2012 System Demonstrations. Association for Computational Linguistics, Jul. 2012, pp. 61-66.

C. Allauzen, M. Mohri, and B. Roark, "Generalized algorithms for constructing statistical language models," in Proceedings of the 41st Annual Meeting on Association for Computational Linguistics—vol. 1, ser. ACL '03. Association for Computational Linguistics, 2003, pp. 40-47.

N. Jaitly, P. Nguyen, A. Senior, and V. Vanhoucke, "Application of pretrained deep neural networks to large vocabulary speech recognition," in Proceedings of Interspeech, 2012., 4 pages.

A. Stolcke, "Entropy-based pruning of backoff language models," in DARPA Broadcast News Transcription and Understanding Workshop, 1998, pp. 270-274.

C. Allauzen, M. Riley, J. Schalkwyk, W. Skut, and M. Mohri, "Openfst: a general and efficient weighted finite-state transducer library," in Proceedings of the 12th international conference on Implementation and application of automata, ser. CIAA'07. Springer-Verlag, 2007, pp. 11-23.

C. Allauzen and M. Riley, "Bayesian language model interpolation for mobile speech input," in Proceedings of Interspeech, 2011, pp. 1429-1432.

* cited by examiner

US 9,460,088 B1

WRITTEN-DOMAIN LANGUAGE MODELING WITH DECOMPOSITION

FIELD

This specification describes technologies related to modeling and recognizing non-lexical entities in automatic speech recognition (ASR).

BACKGROUND

Automatic speech recognition (ASR) systems allow users to provide input as spoken words. ASR is especially valuable as a means of input for mobile devices.

ASR systems are well-adapted to recognize lexical entities, such as ordinary words. However, it may be helpful if ASR systems are able to recognize non-lexical entities. Non-lexical entities include entities such as web addresses (URLs), e-mail addresses, phone numbers and dollar amounts, that, when represented in written form, include things such as digits, composite words, arbitrary character sequences, and punctuation as well as regular words. However, recognizing non-lexical entities presents challenges for ASR systems.

SUMMARY

Since non-lexical entities encountered by ASR systems are generally composed of multiple words, it is hard to recognize non-lexical entities and to provide proper pronunciations for non-lexical entities by ASR systems. The data sparsity and high out-of-vocabulary (OOV) rate for non-lexical entities makes the language modeling more challenging. To address these problems, embodiments use an improved form of written-domain language modeling.

The embodiments described herein provide recognition of non-lexical entities with improved accuracy and performance. In general, one innovative aspect of the subject matter described in this specification can be embodied in a process that is performed by a data processing apparatus. The process includes accessing decomposed training data that results from applying rewrite grammar rules to original training data, the decomposed training data comprising (i) regular words from the original training data that have not been rewritten using the set of rewrite grammar rules, and (ii) decomposed segments that result from rewriting non-lexical entities from the original training data using the rewrite grammar rules; generating a restriction model that (i) maps language model paths for regular words to themselves, and (ii) restricts language model paths for decomposed segments for non-lexical entities; training a n-gram language model over the training data; composing the restriction model and the language model to obtain a restricted language model; and constructing a decoding network by composing a context dependency model and a pronunciation lexicon with the restricted language model.

Other embodiments include corresponding systems, apparatus, and computer programs, configured to perform the actions of the methods, encoded on computer storage devices.

Embodiments can each optionally include one or more of the following features. For instance, embodiments may further include using the decoding network to recognize regular words and non-lexical entities that are part of a first spoken command to produce a recognition transcription. Embodiments may also further include restricting language model paths by the restriction model ensures that non-lexical entities that are begun are also ended. In some embodiments, composite words in a decomposed non-lexical entity are decomposed into segments by finding the most likely splitting of the composite words, and finding the most likely splitting of the composite words comprises using a statistical n-gram model trained over the words in a pronunciation lexicon to find the most likely splitting. Some embodiments further include adding at least one of a reward or a cost to the restriction model. In some embodiments, the language model is represented as a deterministic weighted finite-state automaton. Additionally, in some embodiments, the restriction model is represented as a deterministic weighted finite-state automaton.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

In the drawings, like numbers reference corresponding parts throughout.

DETAILED DESCRIPTION

Figure 1:
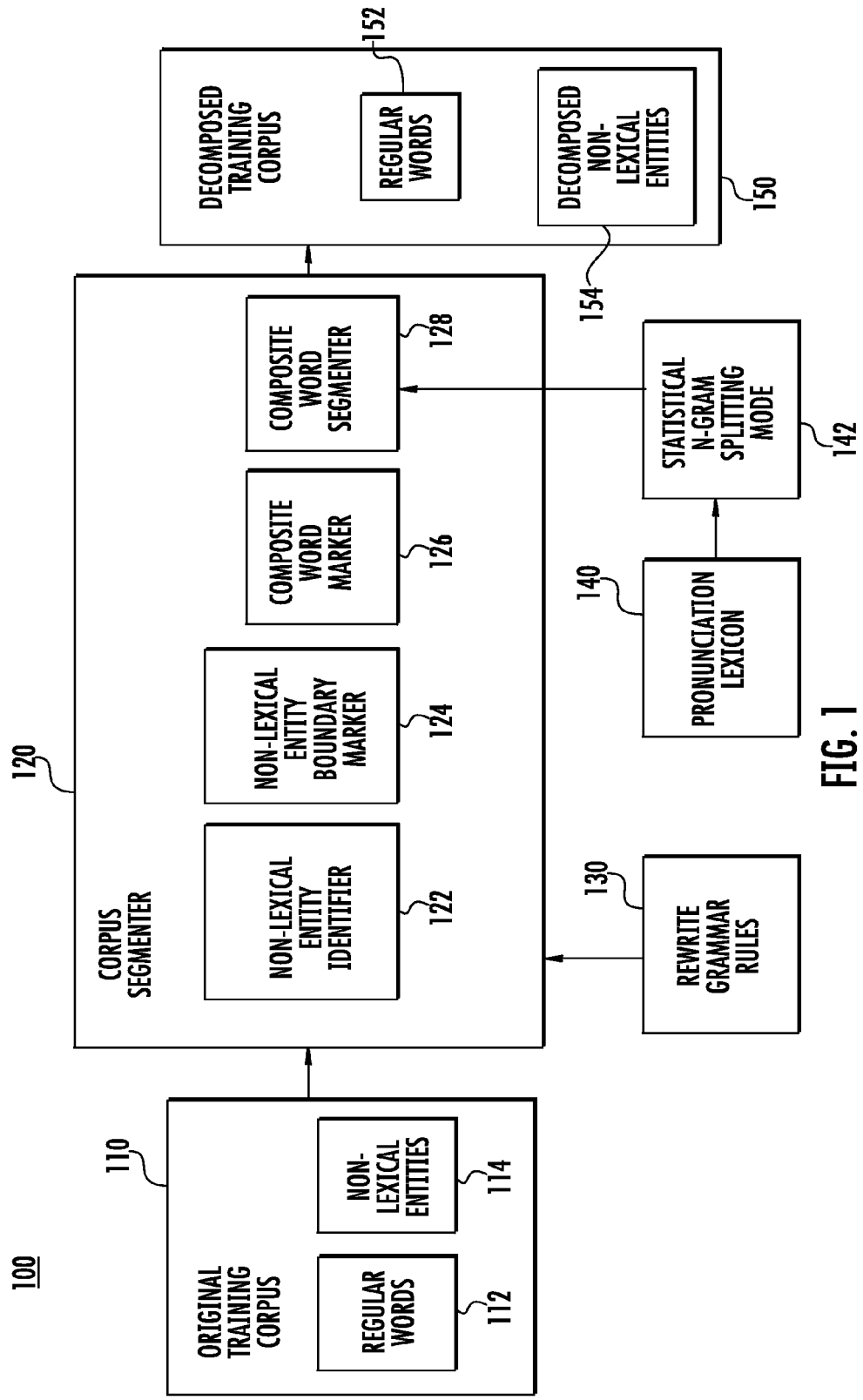
FIG. 1 is a block diagram of parts of a system that prepares training data for a method that improves recognition of non-lexical entities.

Language modeling for automatic speech recognition (ASR) systems has traditionally been performed in the verbal domain. Embodiments present an alternative, which includes finite-state modeling techniques that allow language modeling to be performed in the written domain. Techniques used in embodiments include a decomposition-recomposition approach to address the out-of-vocabulary (OOV) and the data sparsity problems that arise with non-lexical entities such as URLs, e-mail addresses, phone numbers, and dollar amounts. The proposed written-domain language modeling approaches can be implemented on a very large vocabulary speech recognition system for English. Such written-domain language modeling improves the speech recognition and the ASR transcript rendering accuracy in the written domain over other systems that use a verbal-domain language model. In addition, the written-domain system is much more efficient since such a system does not require complex and error-prone text normalization and denormalization rules, which are otherwise required for verbal-domain language modeling.

ASR systems transcribe utterances into written language. Written languages have lexical entities, such as "book" or "one" and non-lexical entities, such as "12:30", "google.com", or "917-555-5555". Lexical entities are distinct from non-lexical entities in that a lexical entity is an actual word in a natural language, while non-lexical entities refer to a single concept or piece of information, but are not actually words due to containing other information such as punctuation, digits, an arbitrary character sequence, or a composition of multiple words that leads to ambiguity in how the non-lexical entity is articulated in verbal form.

Both lexical and non-lexical entities have a written representation that refers to one concept. For example, the word "paper" and the dollar amount "$12.50" both refer to a specific concept. However, because "paper" is actually a word, it is a lexical entity. It is straightforward for ASR systems to work with lexical entities because there is a clear relationship between how "paper" is uttered and the transcription. However, a non-lexical entity, such as "$12.50" identifies a clear quantity of money, but may be articulated verbally in multiple ways.

The form of the linguistic units output from an ASR system depends on the language modeling units. In one implementation, the language modeling units may be the lexical units in verbal form. The reason for providing the lexical units in verbal form is that embodiments need the pronunciations of the language modeling units for the phonetic acoustic models. Therefore, one approach may be to pre-process the training text with text normalization rules. The pre-processing step expands the non-lexical entities such as numbers, dates, times, dollar amounts, URLs into verbal forms. For example, "$10" might become "ten dollars". With a verbal-domain language modeling approach, the speech recognition transcript in verbal language needs to be converted into a properly formatted written language to present to the user. However, the verbal-domain language modeling approach presents challenges. The pre-processing of training text and the post-processing of the speech transcript are ambiguous tasks in the sense that there can be many possible conversions. Another source of error arises due to the potential for a lack of boundaries in the verbal expanded forms.

An alternative approach is written-domain language modeling. In written-domain language modeling, the lexical and non-lexical entities are the language modeling units. The pronunciation lexicon generally handles the verbalization of the non-lexical entities and providing the pronunciations. One advantage of written-domain language modeling approach is that the speech transcripts are in written language. Another advantage is that written-domain language modeling can benefit from the disambiguation power of the written-domain language model to choose the proper format for the transcript. However, in some implementations written-domain language modeling suffers from OOV words and data sparsity problems since the vocabulary has to contain the non-lexical entities.

By contrast, embodiments provide a written-domain language modeling approach that uses finite-state modeling techniques to address the OOV and data sparsity problems when modeling non-lexical entities. Embodiments provide a method for decomposing and marking the boundaries of non-lexical entities in a language model training text. Embodiments also provide a restriction model, which may be a finite-state machine to be composed with the language model to ensure that the beginning and ending of the non-lexical entities are enforced appropriately. To address the problems that arise in recognizing non-lexical entities, embodiments provide a decomposition-recomposition approach as will be subsequently described.

The OOV words and data sparsity problems for the non-lexical entities present important issues. For instance, experimental data indicates that even with a large language model vocabulary size, the OOV rate for the web addresses is still very high as calculated over the web addresses in a voice search test set. Modeling such in-vocabulary entities as a single unit may suffer from the data sparsity problem. Moreover, the single unit approach does not address the pronunciation of composite tokens, such as "nytimes.com". Some embodiments present an approach that helps manage the issues that arise in other approaches. The approach of such embodiments is based on the decomposition of the non-lexical entities into their constituent lexical units, while offering a method to combine the lexical units back together using a finite state transducer framework.

One embodiment includes marking the beginning and ending of the lexical segments with special marker tokens. Such an embodiment also uses an n-gram based statistical segmenter to decompose composite tokens such as domain names. Using the obtained decomposed training corpus, implementations train a standard n-gram language model. In addition, approaches build another finite-state restriction model to restrict the language model paths starting with the special begin marker to end with the special end marker. Then, embodiments compose the restriction model with the language model to apply the restriction. The composition helps ensure that speech decoding with the final restricted language model will output lexical segments for the non-lexical items by guaranteeing that one a sequence has begun, the sequence will end as well. Embodiments then do a straightforward post-processing to combine the segments.

The decomposition transducer is compiled from a set of rewrite grammar rules. The rules are implemented to decompose non-lexical entities and add special tokens to mark the beginning and end of the decomposed segments. For instance, the rewrite grammar rule that is used for URLs decomposes "nytimes.com" to "[url] nytimes dot com [/url]". The rewrite grammar rules also mark the tokens that might be a composite token with a special symbol, such as an asterisk (*). The marked composite tokens may require further processing to find correct pronunciation. To do so, embodiments build a statistical model for segmenting composite tokens. The segmentation of the composite tokens is needed to give a proper pronunciation using the pronunciation lexicon. For the purpose of processing the composite tokens, embodiments train an n-gram language model, e.g., a unigram model, bigram model or a trigram model, over the vocabulary of the static pronunciation lexicon. Then, embodiments construct an FST, so that the inverted transducer maps the vocabulary symbols to their character sequences. The result of composing the n-gram language model and the inverted transducer is a weighted FST that can be used for segmenting the composite words. To accomplish the segmentation, embodiments construct an FST model for the character sequences of an input word, compose the FST model with the segmentation model, find the shortest path and print the output labels. The decomposition transducer is used to decompose each token in the vocabulary. If the token is decomposed, embodiments try to segment the decomposed tokens marked with the special symbol, e.g., an asterisk, using the statistical segmentation model.

For the URL example, the segmented tokens will be "[url] ny times dot com [/url]," since for the "nytimes" the most likely segmentation will be "ny times". Embodiments mark each token segment except the marker tokens with a special symbol to differentiate the marker tokens from the other tokens in the training corpus. Embodiments store the segmentation for each token in the vocabulary. For the example, the segmented and marked tokens will be "[url] ny~times~dot~com~[/url]". If the token cannot be decomposed with the decomposition transducer, an embodiment stores the token itself as the segmentation. Using the stored segmentations of the tokens in the vocabulary, embodiments decompose the training corpus to obtain a decomposed corpus. Then, embodiments train an n-gram language model over the decomposed corpus, and the language model is efficiently represented as a deterministic weighted finite-state automaton.

Additionally, embodiments construct a finite-state restriction-recomposition model using the token segmentations. Embodiments use a technique that constructs a weighted finite-state transducer R=(Q, I, F, E), where Q is a finite set of states, I, which is a subset of Q, is a set of initial states, F, which is a subset of Q, is a set of final states, and E is a finite set of transitions. The transitions each include source state, input label, output label, transition cost, and target state. Embodiments may use a weighted finite-state transducer based approach to model the entities in the language model. Weighted finite-state transducers (WFSTs) are typically used to represent all the components of a speech recognition system.

The composition technique is used to efficiently combine the components into a single finite-state decoding network. In a finite-state transducer based ASR system, a decoding network D is typically constructed by composing following finite-state models; a context dependency model C mapping context-dependent phones to context-independent phones, a pronunciation lexicon L mapping context-independent phone sequences to words, and an n-gram language model G assigning probabilities to word sequences. In the WFST framework, composing the models is expressed as D=C∘L∘G, where ∘ is the composition operator.

Figure 3:
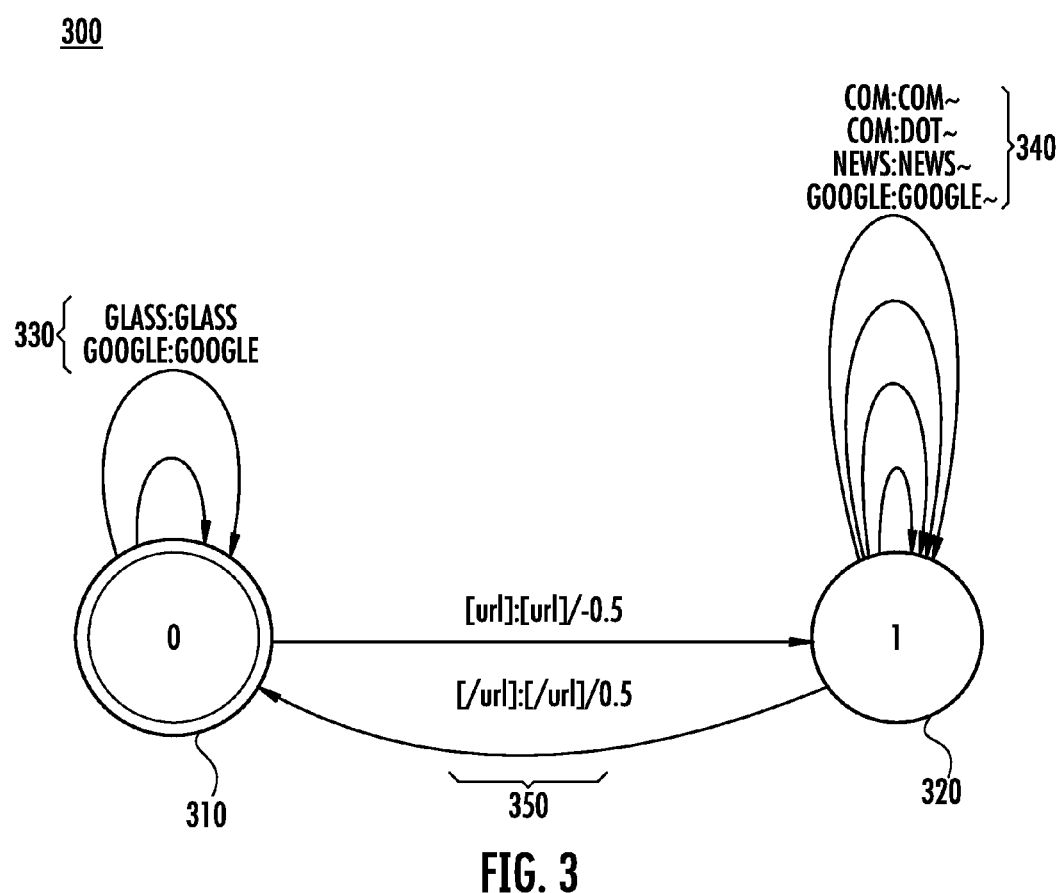
FIG. 3 is an example restriction/recomposition model, R.

As discussed, embodiments use rewrite grammar rules to decompose the non-lexical words in the training corpus to the constituting lexical segments. The rewrite rules are commonly used for text processing and verbal expansion for text-to-speech and speech recognition, and they can be efficiently compiled into finite-state transducers. Embodiments mark the beginning and ending of the non-lexical segments with special marker tokens. Embodiments also use an n-gram based statistical segmenter to decompose composite words such as URL names. Using the obtained decomposed training corpus, embodiments train a standard n-gram language model. In addition, embodiments build another finite-state restriction model to restrict the language model paths starting with the special begin marker to end with the special end marker. Embodiments compose the restriction model with the language model to apply the restriction. The composition guarantees that speech decoding with the final restricted language model will output lexical segments for the non-lexical items properly marking the start and end of the sequence. Embodiments then use a simple postprocessing to combine the segments. An example restriction model is shown in FIG. 3, and will be discussed in greater depth later.

For example, in a restriction-recomposition model, the start state maps all the regular words to themselves. Embodiments add the special begin marker "[url]" as a transition label to a new state and add the special end marker "[/url]" as a transition label to the start state. Embodiments add the transition label with the input decomposed segment and the output decomposed segment marked with a special symbol for each decomposed segment. Additionally, embodiments can optionally add some rewards and costs to the special marker transitions as shown in FIG. 3 to compensate in the construction of the language model probability estimation for the special begin marker. Rewards and costs alter the probabilities associated with the special begin and end marker to help increase the chances that the markers will be recognized and enforced properly.

Embodiments build a finite-state pronunciation lexicon. The final step constructs the decoding graph. The restriction model and the language model are composed to get the restricted language model. The restriction step guarantees that the paths in the language model starting with the special begin marker token end with the special end marker token. The restriction step is required to get the boundaries of the segmented tokens, so that embodiments can use a simple text processing step to combine the segments and construct the proper written form for the entities. The restricted language model is projected on the input side to obtain the final restricted language model without the marking symbol. Then, the restriction language model is composed with the lexicon, and the context dependency model to get the decoding graph. With the proposed approach, the speech recognition transcripts contain the segmented forms for the non-lexical entities that are decomposed. However, the beginning and end of the segments are marked with the special tokens. Therefore, embodiments apply a straightforward text denormalization to the transcripts to combine the segments and remove the special tokens before providing the transcripts as output. For instance, a possible transcript with such an approach will be "go to [url] ny times dot com [/url]" and the transcript will be normalized to "go to nytimes.com".

The segmentation of the non-lexical entities alleviates the data sparsity problem. In addition, the segmentation addresses the OOV problem for the entities, since the language model trained over the segments can generate unseen entities by combining segments from different entities.

The decomposition-recomposition techniques presented here work to address the OOV words and data sparsity problems in the context of non-lexical entities. The written-domain language modeling using the proposed approaches overcomes the shortcomings of the verbal-domain language modeling. First of all, proposed embodiments simplify the speech recognition system by eliminating complex and error-prone text normalization and denormalization steps. Secondly, proposed embodiments significantly improve the speech transcription accuracy in written language, since embodiments receive an advantage from the contextual disambiguation of the written-domain language model. Finally, the decomposition-recomposition approach provides an elegant and contextual language model integrated solution for the pronunciation and modeling of non-lexical entities.

FIG. 1 is a block diagram of parts of a system that prepares training data for a method that improves recognition of non-lexical entities. FIG. 1 illustrates a system architecture 100 that includes an original training corpus 110 that includes original training data, the original training data including regular words 112 and non-lexical entities 114. Before processing, the contents of original training corpus 110 are not segmented or marked up. As discussed above, original training corpus 110 is processed by a corpus segmenter 120 to turn original training corpus 110 into decomposed training corpus 150. In order to process original training corpus 110, corpus segmenter 120 includes a variety of constituent modules. For example, corpus segmenter 120 may include a non-lexical entity identifier 122, a non-lexical entity boundary marker 124, a composite word marker 126, and a composite word segmenter 128. Additionally, corpus segmenter 120 interfaces with a set of rewrite grammar rules 130. The role of rewrite grammar rules 130 has been discussed previously, in that rewrite grammar rules 130 provide instructions that facilitate the breakdown of non-lexical entities 114. In the context of FIG. 1, rewrite grammar rules 130 aid in the functionality provided by non-lexical entity identifier 122, non-lexical entity boundary marker 124, composite word marker 126, and composite word segmenter 128. Additionally, system architecture 100 includes pronunciation lexicon 140. Pronunciation lexicon 140 can be used as training data to train statistical n-gram splitting model 142. N-gram splitting model 142 provides information to composite word segmenter 128 about how to split composite words identified by composite word marker 126.

In order to process original training corpus 110, corpus segmenter 120 begins with the operation of non-lexical entity identifier 122. Non-lexical entity identifier 122 separates non-lexical entities 114 from regular words 112 in original training corpus 110. Corpus segmenter 120 only needs to segment non-lexical entities 114, so it is important for non-lexical entity identifier to separate non-lexical entities 114 and ignore regular words 112. Then, non-lexical entity boundary marker 124 identifies the boundaries of the non-lexical entity. Two types of boundaries are identified by non-lexical entity boundary marker 124. One type of boundary is the start and end of a non-lexical entity, each of which may have tags. The other type of boundary is between segments within a non-lexical entity, such as "google.com" becoming "google dot com". Additionally, composite word marker 116 marks appropriate parts of a non-lexical entity as requiring further splitting. For example, "googlenews" may be marked with an asterisk by composite word marker 116 as "googlenews*". Based on the marker, composite word segmenter 128 processes "googlenews*" in conjunction with the information provided by statistical n-gram splitting model 142, and can split "googlenews*" into "google news". Additionally, the individual segments may be tagged with a character, such as a tilde (~). For example, the tagging function may be performed by non-lexical entry boundary marker 124 or composite word marker 126.

After the processing by corpus segmenter 120, original training corpus 110 becomes decomposed training corpus 150. Decomposed training corpus 150 includes regular words 152 and decomposed non-lexical entities 154. As noted, regular words 152 are not decomposed, but decomposed non-lexical entities 154 provide raw data for modeling non-lexical entities subsequently with finite-state models.

Figure 2:
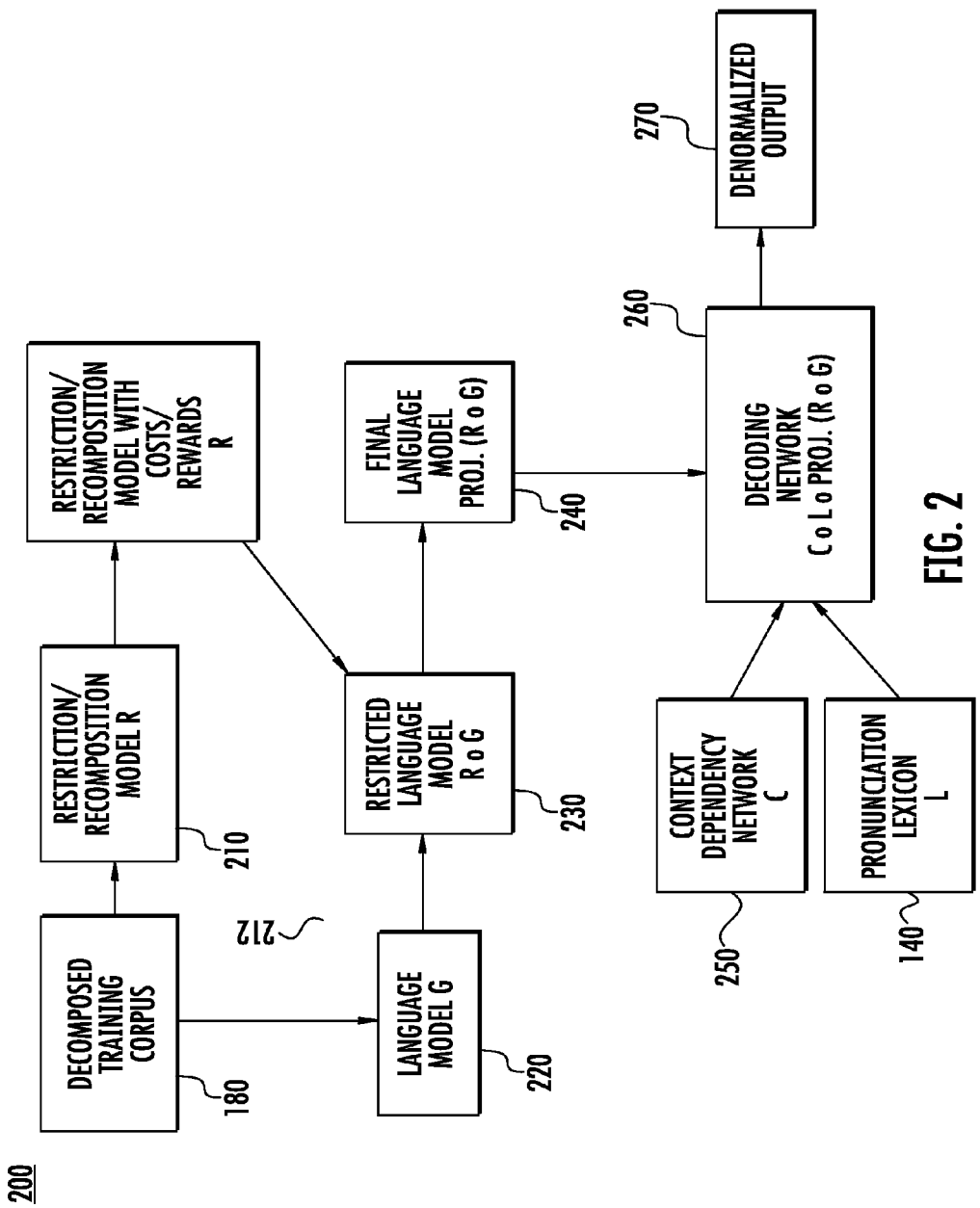
FIG. 2 is a flow diagram between constituent parts of a system that uses the training data to model non-lexical entities.

FIG. 2 is a flow diagram between constituent parts of a system that uses the training data to model non-lexical entities. FIG. 2 shows a flow diagram 200 that originates from decomposed training corpus 150 generated as shown in FIG. 1. Decomposed training corpus 150 is used as a source of data for building restriction/recomposition model 210 (R) and language model 220 (G). FIG. 2 illustrates that restriction/recomposition model 210 may be further refined to provide a restriction/recomposition model 212 with added costs and rewards. Either restriction/recomposition model 210 or restriction/recomposition model with added costs and rewards 212 may be composed with language model 220 (G). The result of the composition is restricted language model 230 (R∘G). Restricted language model 230 may be projected to yield final language model 240 Proj. (R∘G). The projection process removes the marking symbols that would otherwise remain due to their use in clarifying segment boundaries. Final language model 240 is then composed with context dependency network 250 (C) and pronunciation lexicon 140 (L). The result of the composition is decoding network 260 C∘L∘Proj. (R∘G). Decoding network 260 is able to recognize non-lexical entities because of the way decoding network 260 was constructed. Decoding network 260 provides denormalized output 270, in which the denormalization involves removing the tokens that are used to denote the beginning and end of non-lexical entities.

FIG. 3 is an example restriction/recomposition model, R. The model is designed to include two members, "google glass" and "googlenews.com". The model is portrayed as a finite-state machine. There is a start state 310 and a new state 320, along with regular words 330 and segments of a non-lexical entity 340. Additionally, special marker tokes 350 causes a transition between start state 310 and new state 320. FIG. 3 illustrates that for a regular word or series of regular words, such as "google glass", no transition occurs. However, once a special start indicator, such as "[url]," is encountered, the state changes and remains in the new state 320 until the corresponding end indicator, such as "[/url]," is encountered, at which point there is a transition back to start state 310. Additional, the finite-state machine may be a weighted finite state machine and the finite-state machine may incorporate weights that help ensure that non-lexical entities are processed properly. For example, FIG. 3 weights the transitions between start state 310 and new state evenly 320, but the weights might be different if a finite-state machine needs to recognize transitions for multiple types of non-lexical entities.

Figure 4:
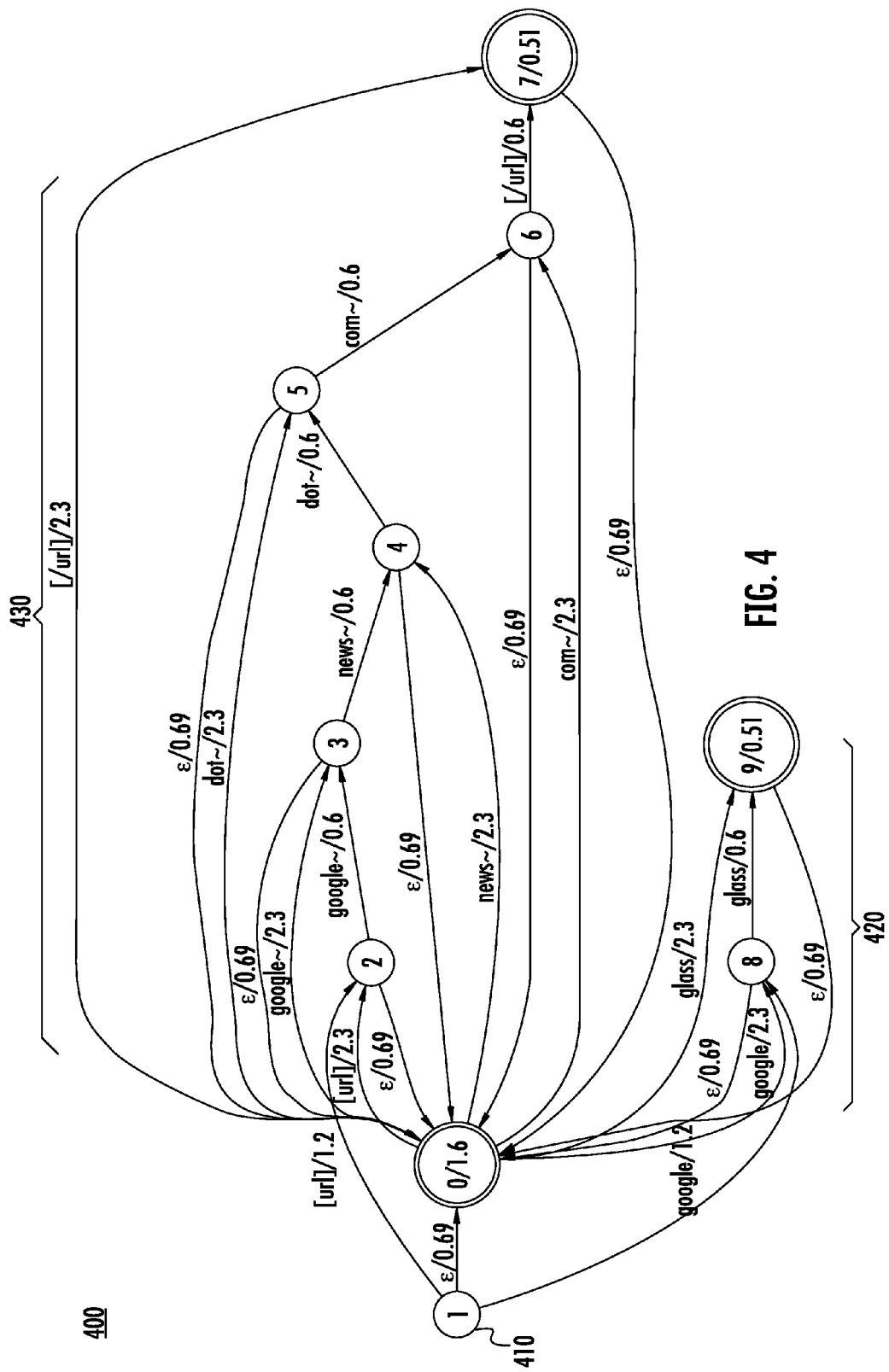
FIG. 4 is an example language model, G.

FIG. 4 is an example language model, G. The language model is trained as an n-gram language model over the decomposed segments. Once again, the language model 400 is illustrated as a finite-state machine. In the example, the language model has been trained so as to recognize a decomposed corpus including "google glass" and "[url] google~news~dot~com~[/url]". The transitions and states portrayed in FIG. 4 are illustrative of a language model trained on such a corpus. The language model begins at start state 410, and contains two main parts, part 420 that includes transitions and states that recognize "google glass" and part 430 that includes transitions and states that recognize "[url] google~news~dot~com~[/url]".

Figure 5:
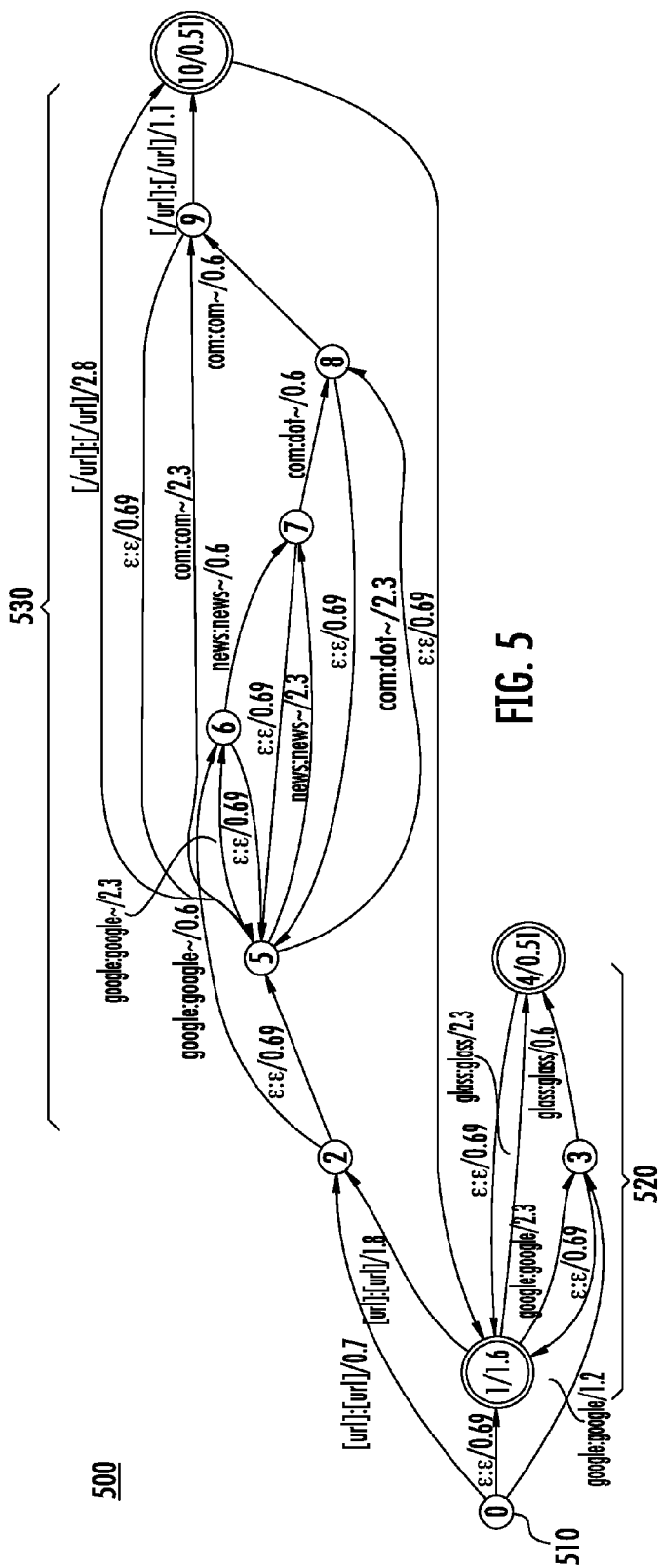
FIG. 5 is an example restriction model composed with a language model, R∘G.

FIG. 5 is an example restriction model composed with a language model, R∘G. By composing R∘G, the result is that the "[url]" and "[/url]" tags cause a transition to and from a different portion of the resulting FST. FIG. 5 includes a finite-state machine 500 with a start state 510. Start state 510 leads to separate subnetworks for recognizing "google glass" and "[url] google~news~dot~com~[/url]", because the composing the restriction model forces recognition of a complete regular word or sub-lexical entity by the composed model before a new regular word or sub-lexical entity is recognized. Thus, subnetwork 520 recognizes "google glass" and subnetwork 530 recognizes "[url] google~news~dot~com~[/url]". However, because the restriction model has been composed with the language model, when transitioning from state to state in FIG. 5, the model is constrained that an entire series of words, e.g. "google glass", or an entire non-lexical entity, e.g. "[url] google~news~dot~com~[/url]" must be processed at once. Thus, composing the models as shown in FIG. 5 helps address the boundary problem.

Figure 6:
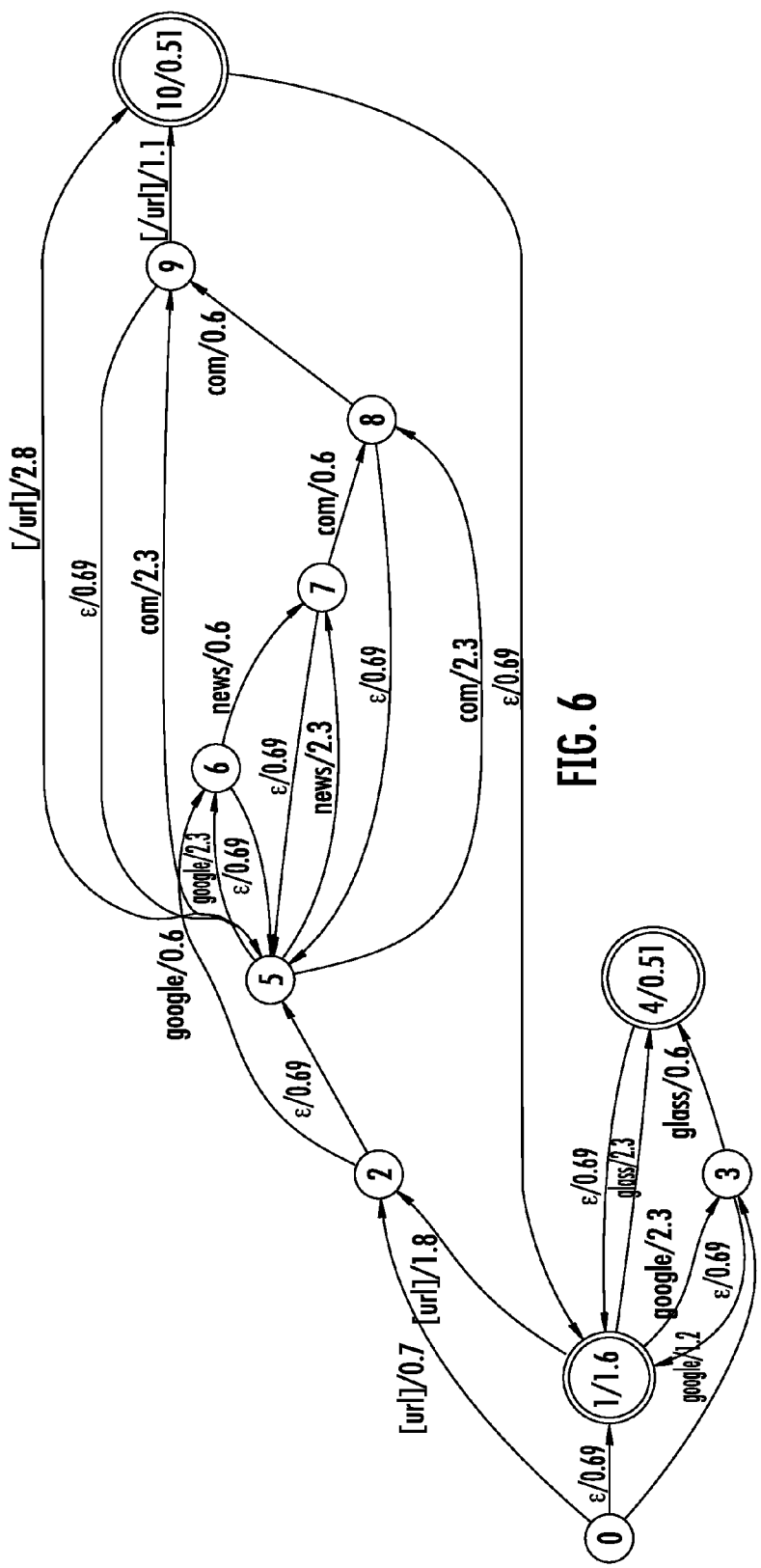
FIG. 6 is an example projected version of the model of FIG. 5, Proj (R∘G).

FIG. 6 is an example projected version of the model of FIG. 5, Proj (R∘G). The difference between FIG. 6 and FIG. 5 is that the projection operation (Proj) removes the segment marker, which may be a tilde (~), as discussed above, from the model. Otherwise, the finite-state machine 600 is the same as that of FIG. 5.

Figure 7:
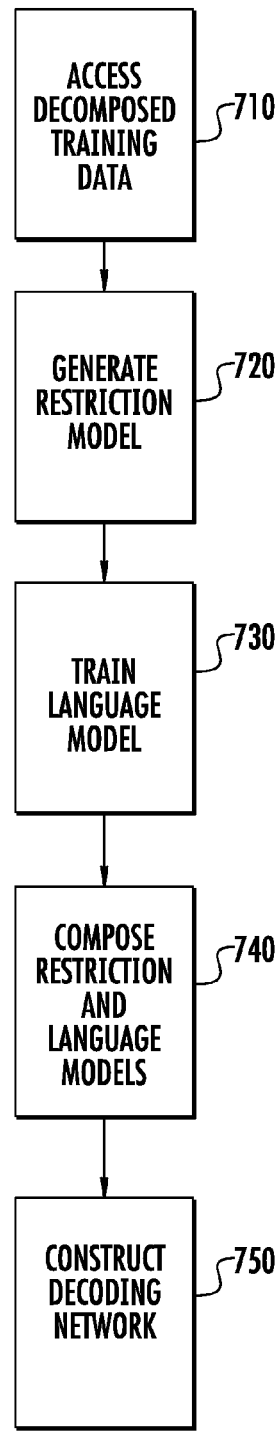
FIG. 7 is a flow chart of steps in the method of one implementation.

FIG. 7 is a flow chart of steps in the method of one implementation.

In block 710, decomposed training data is accessed. More specifically, implementations access decomposed training data that results from applying rewrite grammar rules to original training data, the decomposed training data comprising (i) regular words from the original training data that have not been rewritten using the set of rewrite grammar rules, and (ii) decomposed segments that result from rewriting non-lexical entities from the original training data using the rewrite grammar rules. For example, the decomposed training corpus 150 as produced in FIG. 1 may be accessed for use by implementations. In the example shown in FIG. 1, the decomposed training corpus 150 is produced by applying corpus segmenter 120 to original training corpus 110.

In block 720, a restriction model is generated. More specifically, implementations generate a restriction model that (i) maps language model paths for regular words to themselves, and (ii) restricts language model paths for decomposed segments for non-lexical entities. The restriction model produced here is the restriction/recomposition model 210 produced from decomposed training corpus 150, and may be further refined to produce restriction/recomposition model with costs/rewards 212, as discussed above.

In block 730, a language model is trained. More specifically, implementations train a n-gram language model over the decomposed training data. The language model is language model 220 trained from decomposed training corpus 150.

In block 740, the restriction and language models are composed. More specifically, implementations compose the restriction model and the language model to obtain a restricted language model. The composed model is restricted language model 230, produced from restriction/recomposition model 210 or restriction/recomposition model with costs/rewards 212 along with language model 220.

In block 750, a decoding network is constructed. More specifically, implementations construct a decoding network 260 by composing a context dependency model 250 and a pronunciation lexicon 140 with the restricted language model 230. The decoding network 260 alternatively uses, in some embodiments, final language model 240, which is derived from restricted language model 230 by a projection operation to remove the segment markers, along with context dependency network 250 and pronunciation lexicon 140. The decoding network 260 may thus be represented as C∘L∘Proj. (R∘G). Subsequently, decoding network 260 may yield denormalized output 270, recombining segments marked with special tokens.

Embodiments presented herein provide the potential to improve recognition accuracy for non-lexical entities by using rewrite grammar rules to process training data and produce decomposed training data, and subsequently building a language model and a restriction model based on the decomposed training data. Such an approach is able to address OOV and data sparsity problems in a simple, effective manner.

A number of implementations have been described. Nevertheless, it will be understood that various modifications may be made without departing from the spirit and scope of the disclosure. For example, various forms of the methods shown above may be used, with steps re-ordered, added, or removed.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and the computer program may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

The invention claimed is:

1. A computer-implemented method comprising:
    accessing decomposed training data that results from applying rewrite grammar rules to original training data, the decomposed training data comprising (i) regular words from the original training data that have not been rewritten using the set of rewrite grammar rules, and (ii) decomposed segments that result from rewriting non-lexical entities from the original training data using the rewrite grammar rules, wherein each regular word is a lexeme in a lexicon of a natural language, and wherein each non-lexical entity (i) is a composite token that is pronounced using one or more lexemes in the lexicon of the natural language, and (ii) is not itself a lexeme in the lexicon of the natural language;
    generating a restriction model that (i) maps language model paths for regular words to themselves, and (ii) restricts language model paths for decomposed segments for non-lexical entities;
    training a n-gram language model over the decomposed training data, wherein, after the training, the n-gram language model comprises at least a first portion for recognizing regular words and a second portion for recognizing non-lexical entities;
    constructing a restricted language model at least by composing the restriction model with the n-gram language model;
    constructing a decoding network at least by composing a context dependency model with a pronunciation lexicon and with the restricted language model; and
    performing, by an automatic speech recognizer that uses the decoding network, speech recognition on an audio data representation of a spoken utterance that references one or more non-lexical entities.

2. The method of claim 1, wherein performing speech recognition on the audio data representation of the spoken utterance that references one or more non-lexical entities comprises using the decoding network to recognize regular words and non-lexical entities that are part of a spoken command to produce a transcription.

3. The method of claim 1, wherein the restriction model that restricts language model paths for decomposed segments for non-lexical entities ensures that a non-lexical entity that is referenced in the audio data representation of the spoken utterance has both a beginning and an ending.

4. The method of claim 1, wherein rewriting a non-lexical entity that includes a composite word into decomposed segments comprises finding the most likely splitting of the composite word using a statistical n-gram model trained over words in a pronunciation lexicon to find the most likely splitting of the composite word.

5. The method of claim 1, further comprising adding at least one of a reward or a cost to the restriction model.

6. The method of claim 1, wherein the language model is represented as a deterministic weighted finite-state automaton.

7. The method of claim 1, wherein the restriction model is represented as a deterministic weighted finite-state automaton.

8. A system comprising:
    one or more computers and one or more storage devices storing instructions that are operable, when executed by the one or more computers, to cause the one or more computers to perform operations comprising:

accessing decomposed training data that results from applying rewrite grammar rules to original training data, the decomposed training data comprising (i) regular words from the original training data that have not been rewritten using the set of rewrite grammar rules, and (ii) decomposed segments that result from rewriting non-lexical entities from the original training data using the rewrite grammar rules, wherein each regular word is a lexeme in a lexicon of a natural language, and wherein each non-lexical entity (i) is a composite token that is pronounced using one or more lexemes in the lexicon of the natural language, and (ii) is not itself a lexeme in the lexicon of the natural language;

generating a restriction model that (i) maps language model paths for regular words to themselves, and (ii) restricts language model paths for decomposed segments for non-lexical entities;

training a n-gram language model over the decomposed training data, wherein, after the training, the n-gram language model comprises at least a first portion for recognizing regular words and a second portion for recognizing non-lexical entities;

constructing a restricted language model at least by composing the restriction model with the n-gram language model;

constructing a decoding network at least by composing a context dependency model with a pronunciation lexicon and with the restricted language model; and performing, by an automatic speech recognizer that uses the decoding network, speech recognition on an audio data representation of a spoken utterance that references one or more non-lexical entities.

9. The system of claim 8, wherein performing speech recognition on the audio data representation of the spoken utterance that references one or more non-lexical entities comprises using the decoding network to recognize regular words and non-lexical entities that are part of a first spoken command to produce a transcription.

10. The system of claim 8, wherein the restriction model that restricts language model paths for decomposed segments for non-lexical entities ensures that a non-lexical entity that is referenced in the audio data representation of the spoken utterance has both a beginning and an ending.

11. The system of claim 8, wherein rewriting a non-lexical entity that includes a composite word into decomposed segments comprises finding the most likely splitting of the composite word using a statistical n-gram model trained over words in a pronunciation lexicon to find the most likely splitting of the composite word.

12. The system of claim 8, wherein the operations further comprise adding at least one of a reward or a cost to the restriction model.

13. The system of claim 8, wherein the language model is represented as a deterministic weighted finite-state automaton.

14. The system of claim 8, wherein the restriction model is represented as a deterministic weighted finite-state automaton.

15. A computer-readable storage device storing software comprising instructions executable by one or more computers which, upon such execution, cause the one or more computers to perform operations comprising:

accessing decomposed training data that results from applying rewrite grammar rules to original training data, the decomposed training data comprising (i) regular words from the original training data that have not been rewritten using the set of rewrite grammar rules, and (ii) decomposed segments that result from rewriting non-lexical entities from the original training data using the rewrite grammar rules, wherein each regular word is a lexeme in a lexicon of a natural language, and wherein each non-lexical entity (i) is a composite token that is pronounced using one or more lexemes in the lexicon of the natural language, and (ii) is not itself a lexeme in the lexicon of the natural language;

generating a restriction model that (i) maps language model paths for regular words to themselves, and (ii) restricts language model paths for decomposed segments for non-lexical entities;

training a n-gram language model over the decomposed training data, wherein, after the training, the n-gram language model comprises at least a first portion for recognizing regular words and a second portion for recognizing non-lexical entities;

constructing a restricted language model at least by composing the restriction model with the n-gram language model;

constructing a decoding network at least by composing a context dependency model with a pronunciation lexicon and with the restricted language model; and performing, by an automatic speech recognizer that uses the decoding network, speech recognition on an audio data representation of a spoken utterance that references one or more non-lexical entities.

16. The device of claim 15, wherein performing speech recognition on the audio data representation of the spoken utterance that references one or more non-lexical entities comprises using the decoding network to recognize regular words and non-lexical entities that are part of a first spoken command to produce a transcription.

17. The device of claim 15, wherein the restriction model that restricts language model paths for decomposed segments for non-lexical entities ensures that a non-lexical entity that is referenced in the audio data representation of the spoken utterance has both a beginning and an ending.

18. The device of claim 15, wherein rewriting a non-lexical entity that includes a composite word into decomposed segments comprises finding the most likely splitting of the composite word using a statistical n-gram model trained over words in a pronunciation lexicon to find the most likely splitting of the composite word.

19. The device of claim 15, wherein the operations further comprise adding at least one of a reward or a cost to the restriction model.

20. The device of claim 15, wherein the restriction model is represented as a deterministic weighted finite-state automaton.

21. The method of claim 1, wherein each non-lexical entity is a non-literal transcription of a spoken utterance.

22. The method of claim 1, wherein constructing the restricted language model at least by composing the restriction model with the n-gram language model comprises performing a mathematical composition of the restriction model with the language model; and constructing the decoding network at least by composing the context dependency model with the pronunciation lexicon and with the restricted language model comprises performing a mathematical composition of the context dependency model with the pronunciation lexicon and with the restricted language model.

* * * * *